(12) United States Patent
Sun et al.

(10) Patent No.: US 7,982,800 B2
(45) Date of Patent: Jul. 19, 2011

(54) VIDEO DE-INTERLACER USING MOTION RESIDUE COMPENSATION

(75) Inventors: Honglin Sun, Austin, TX (US); David A. Hayner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1203 days.

(21) Appl. No.: 11/670,846

(22) Filed: Feb. 2, 2007

(65) Prior Publication Data

US 2008/0186401 A1   Aug. 7, 2008

(51) Int. Cl.
*H04N 7/01* (2006.01)
(52) U.S. Cl. ........................................................ 348/448
(58) Field of Classification Search .................. 348/448, 348/441, 443, 451, 447, 449, 452, 458
See application file for complete search history.

(56) References Cited

U.S. PATENT DOCUMENTS

| | | | |
|---|---|---|---|
| 6,380,978 B1 * | 4/2002 | Adams et al. | 348/452 |
| 6,728,317 B1 | 4/2004 | Demos | |
| 6,734,916 B1 | 5/2004 | Sims | |
| 6,799,168 B1 | 9/2004 | He et al. | |
| 6,847,405 B2 | 1/2005 | Hsu et al. | |
| 6,891,571 B2 | 5/2005 | Shin | |
| 6,894,726 B2 | 5/2005 | Carlsgaard et al. | |
| 6,897,903 B1 | 5/2005 | Hu | |
| 6,909,752 B2 | 6/2005 | Zhou | |
| 6,925,124 B2 | 8/2005 | Lunter | |
| 6,950,560 B2 | 9/2005 | Weston | |
| 6,965,705 B1 | 11/2005 | Ma et al. | |
| 6,992,725 B2 | 1/2006 | Mohsenian | |
| 7,023,920 B2 | 4/2006 | Schutten et al. | |
| 7,057,664 B2 | 6/2006 | Law et al. | |
| 7,068,722 B2 | 6/2006 | Wells | |
| 7,075,581 B1 * | 7/2006 | Ozgen et al. | 348/448 |
| 7,154,555 B2 * | 12/2006 | Conklin | 348/448 |
| 7,605,866 B2 * | 10/2009 | Conklin | 348/448 |
| 7,864,246 B2 * | 1/2011 | MacInnis | 348/448 |

* cited by examiner

*Primary Examiner* — Paulos M Natnael
(74) *Attorney, Agent, or Firm* — Gary R. Stanford (57) ABSTRACT

A method of de-interlacing input video information including averaging odd lines and averaging even lines of the input video information to determine first and second in-field information, determining differences between even and odd lines of the input video information to provide residue information, measuring a motion metric of the residue information, filtering the residue information based on the motion metric to provide filtered residue information, and combining the first and second in-field information with the filtered residue information to provide progressive information. The combining may be an average of the in-field information added to a weighted portion of the filtered residue information as determined by the motion metric. The motion metric may be determined by an infinite impulse response filter. Finite impulse response filters may be used to filter the residue information.

20 Claims, 5 Drawing Sheets

| MM | HY | VY | HFA | HFB | GO | GE | GR |
|---|---|---|---|---|---|---|---|
| MM1 | HF1 | VF1 | HFA1 | HFB1 | GO1 | GE1 | GR1 |
| MM2 | HF2 | VF2 | HFA2 | HFB2 | GO2 | GE2 | GR2 |
| ⋮ | ⋮ | ⋮ | ⋮ | ⋮ | ⋮ | ⋮ | ⋮ |

FIG. 9

VIDEO DE-INTERLACER USING MOTION RESIDUE COMPENSATION

BACKGROUND OF THE INVENTION

1. Field of the Invention

This disclosure relates generally to video information processing, and more specifically, to a video de-interlacer which converts interlaced video information into progressive video information based on motion residue compensation.

2. Description of the Related Art

The interlaced video format is widely used primarily because of the technology development of the video industry. The current generations of television (TV) standards, for example, are primarily based on the interlaced video format. The progressive video format, however, is preferred for the newer display technologies, such as liquid crystal display (LCD), plasma, digital light processing (DLP), etc. For progressive scan video information, the video is displayed line by line from top to bottom rather than by field. For interlaced scan, every other horizontal line of the video is displayed in separate fields and each frame is completed in two passes. In particular, each frame or picture is divided into two fields including an odd field and an even field, in which the odd and even fields are displayed one at a time in alternating fashion. Because interlaced video is composed of two fields that are captured at different moments in time, interlaced video frames exhibit motion artifacts when both fields are combined and displayed at the same moment and the video contains motion.

A de-interlacer is used to convert interlaced video into non-interlaced or progressive video for display. Many solutions exist for performing the de-interlacing function. The relatively unsophisticated solutions simply copy odd lines to even or vice-versa or display the odd and even fields together. If the de-interlacing function is not done properly, however, the displayed video contains a significant amount of visual artifacts especially when the video contains a significant amount of motion. More sophisticated solutions are available, but such solutions generally consume a significant level of processing power and bandwidth (including bus and memory bandwidth), and are relatively costly. It is desired to convert interlaced video into progressive scan video while ensuring a relatively high level of visual quality. It is further desired to perform the de-interlacing function with improved performance in low cost or portable devices. It is desired to provide a low cost or portable system which requires a minimal amount of bus and memory bandwidth while providing a reasonably high quality signal appropriate for smaller displays typically in portable or automobile configurations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
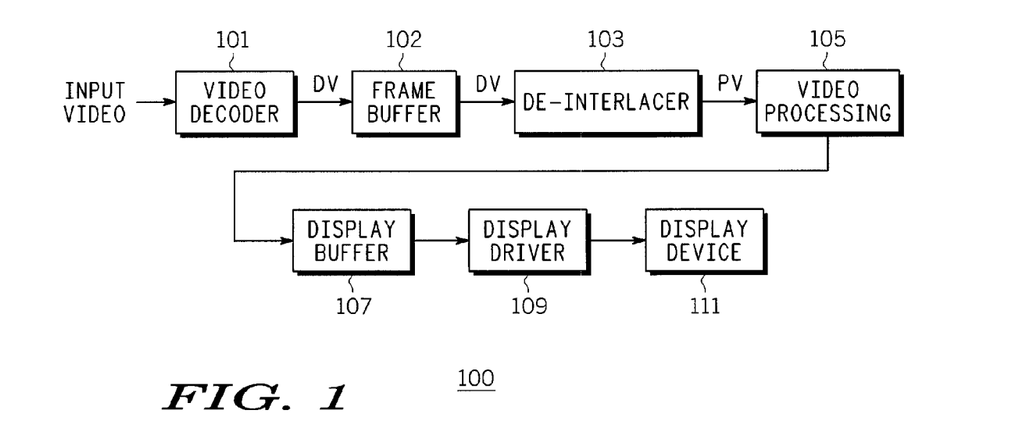
FIG. 1 is a block diagram of a video processing system implemented according to one embodiment.

FIG. 1 is a block diagram of a video processing system 100 implemented according to one embodiment. Encoded input video information, provided from an input bitstream or from a storage device or the like (not shown), is provided to a video decoder 101, which generates and stores decoded video (DV) information into a frame buffer 102. The DV information stored in the frame buffer 102 is provided to a de-interlacer 103, which converts interlaced video information into progressive video (PV) information. The PV information is provided to video processing circuitry 105, which performs additional video processing functions on the PV information, such as scaling and color space conversion, and the like. The video information remains in progressive format and is modified according to the additional video processing functions as known to those skilled in the art. For example, YCrCb information may be converted to red (R), green (G), blue (B) information (or RGB information) for display. The progressive video output of the video processing circuitry 105 is coupled to a display buffer 107, which temporarily stores the progressive video information for display. A display driver 109 retrieves the progressive video information from the display buffer 107 for display on a display device 111. The display device 111 is configured to display progressive scan video information. In the event that the encoded input video information is already in progressive scan format, then the de-interlacer 103 is either disabled or bypassed, so that the DV information from the video decoder 101 is provided directly as the PV information to the video processing circuit 105.

In the illustrated embodiment, the DV information is provided in YCrCb interlaced video format forming three (3) separate color channels, including Y, Cr, and Cb channels. Interlaced video includes an odd field and an even field collectively corresponding to each video frame of the video information. For the Y channel, each field has the same horizontal resolution as a video frame, but only half of the vertical resolution. This is due to the fact that each video field only holds either odd numbered or even numbered vertical scan lines of a video frame. The Cr and Cb fields are sampled at half the rate in both horizontal and vertical directions as compared to the Y channel, but are also divided into separate fields for the interlaced information. The video fields, therefore, are categorized as odd fields and even fields. The refresh rate for the video fields is double that of the video frames. In this manner, each of the 3 channels of the interlaced DV information includes even and odd information (when interlaced). The Y channel contains "luma" component values which define the luminance of the color component and the Cr and Cb channels contain "chroma" component values which incorporate information of color reconstruction. The Y (or luma) channel has wider bandwidth and stronger intensity as compared to the Cr and Cb (chroma) channels. In illustrated embodiments, different techniques are applied to the different color channels as further described below. The Cr and Cb information is provided and processed in separate channels that are processed in substantially the same manner as compared to the Y channel information, so that the Cr and Cb are described together herein.

Figure 2:
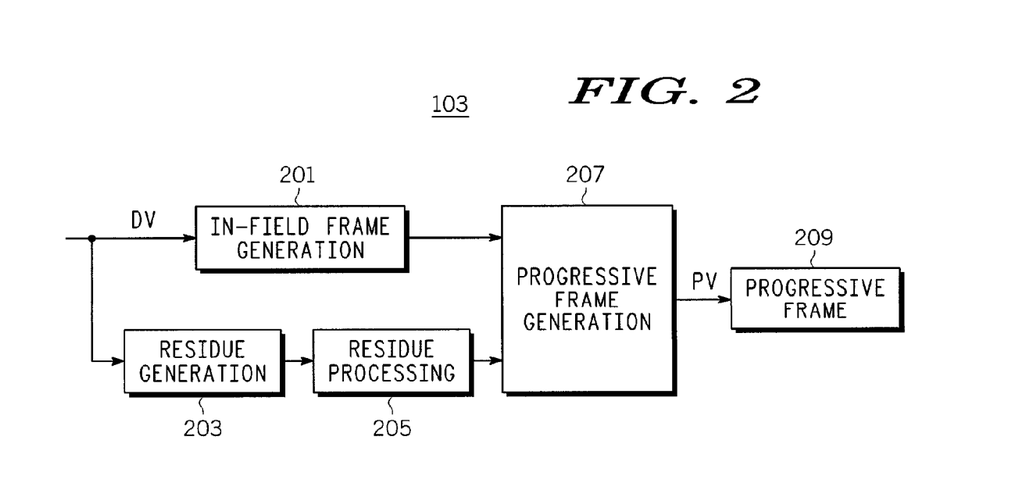
FIG. 2 is a block diagram of the de-interlacer of FIG. 1 according to an exemplary embodiment.

FIG. 2 is a block diagram of the de-interlacer 103 according to an exemplary embodiment. The DV information from the frame buffer 102 is provided to the input of an in-field frame generation circuit 201 and to the input of a residue generation circuit 203. The output of the in-field frame generation circuit 201 is provided to one input of a progressive frame generation circuit 207, having an output providing the PV information as a progressive frame 209 to the video processing circuit 105. The output of the residue generation circuit 203 is provided to the input of a residue processing circuit 205, having its output provided to a second input of the progressive frame generation circuit 207. The progressive frame generation circuit 207 combines the outputs of the in-field generation and residue processing circuits 201 and 205 to generate the progressive frame 209.

Each of the circuits 201, 203, 205 and 207 may use memory in the form of buffer space or the like for temporarily storing input and output information. The memory space provides work and storage space for the corresponding processing circuits to perform their functions and for storing the results, in which the result is provided at the output of the corresponding processing circuit. For example, odd and even lines of the Y-channel information may be stored in respective buffers and the in-field generation circuit 201 averages the information, as further described below, for determining the information of the intermediate lines within each of the buffers. The results stored in the buffers are provided at the output of the in-field generation circuit 201 to the progressive frame generation circuit 207 for generating the progressive frame 209, which is temporarily stored in other buffer space. The buffers may be implemented as separate memory devices or combined in any suitable manner into one or more common memory devices, such as within a unified memory or the like. A unified memory may further include one or both of the frame buffer 102 and the display buffer 107 depending upon the particular implementation. Alternatively, the frame buffer 102 may be a separate memory device or otherwise incorporated within the video decoder 101, such as a codec chip or the like. Also, the display buffer 107 may be implemented as a separate type of memory and may be a separate memory device or integrated into display logic or the like.

Figure 3:
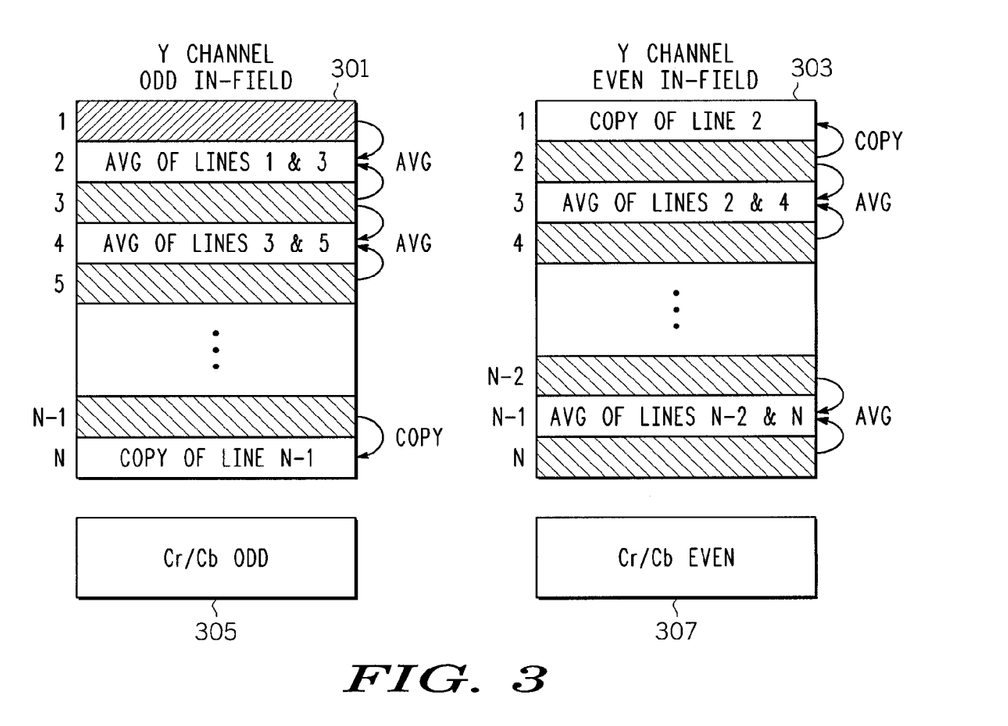
FIG. 3 is a figurative block diagram illustrating an exemplary in-field frame generation procedure performed by the in-field frame generation circuit of FIG. 2.

FIG. 3 is a figurative block diagram illustrating an exemplary in-field frame generation procedure performed by the in-field frame generation circuit 201. Specific processing details are shown for the even and odd Y channel information in which substantially the same processing if performed for the Cr/Cb channel information. The Y channel information stored within the frame buffer 102 includes N horizontal lines in which the odd lines 1, 3, 5, . . . , N-1 form the odd field and the even lines 2, 4, . . . , N form the even field. In-field frame generation is applied separately to the odd and even fields and provides two separate progressive video frames based on the odd and even input fields with vertical linear interpolation. A first Y channel in-field frame 301 is processed using information from the odd field and a second Y channel in-field frame 303 is processed using information from the even field. The shaded lines in each in-field frame depict the input horizontal lines provided from the DV information and the non-shaded lines between the shaded lines depict information that is determined or calculated from information stored in the shaded lines. The odd lines of the odd field from the DV information are loaded into the odd lines of the Y channel in-field frame 301 and the even lines of the even field are loaded into the even lines of the Y channel in-field frame 303. The in-field frame generation circuit 201 calculates the information for the second line, or line 2, of the Y channel in-field frame 301 by averaging (AVG) the information from the odd lines 1 and 3. The averaging process is performed on a pixel-by-pixel basis. In particular, the first pixel of line 2 is the average of the first pixels of lines 1 and 3, and so on. The averaging procedure is performed to determine the content of each even line using adjacent odd lines of the Y channel in-field frame 301 except for the last line N. The last line N is a copy of the contents of the immediately preceding line N-1.

The odd lines of the Y channel in-field frame 303 are determined in similar manner by averaging adjacent even lines other than the first line 1. The in-field frame generation circuit 201 copies the second line 2 to the first line 1 of the second Y channel in-field frame 303. Thereafter, the in-field frame generation circuit 201 calculates the information for the next odd line of the Y channel in-field frame 303, or the third line 3, by averaging the information from the adjacent even lines 2 and 4. Again, the averaging process is performed on a pixel-by-pixel basis to determine the values of the pixels of the odd lines of the Y channel in-field frame 303. The averaging procedure is performed to determine in-field video contents of each of the odd lines of the Y channel in-field frame 303 including the last odd line N-1. The in-field frame generation circuit 201 performs substantially the same process for the odd and even Cr/Cb channel information to generate a Cr/Cb channel in-field frame 305 and another Cr/Cb channel in-field frame 307. As previously described, in-field frame generation performed by the in-field frame generation circuit 201 is applied separately to the odd and even fields and provides two separate progressive video frames based on the odd and even input fields with vertical linear interpolation. The frames 301 and 305 collectively form a first frame of information and the frames 303 and 307 collectively form a second frame of information for the three channels. In one embodiment, the averaging calculation is rounded to the nearest integer values without using floating point arithmetic in order to reduce processing requirements. Alternatively, floating point arithmetic may be used if more accurate results are desired.

The in-field frame generation circuit 201 may use different buffers or buffer space for determining and storing information for the in-field frames 301-307. In the embodiment illustrated, the sizes of the buffers are significantly smaller than that which would otherwise be needed to store all of the Y-channel information or to store all of the Cr/Cb information for an entire frame. In one embodiment, for example, each of the buffers is sized to store only a few lines of the respective in-field frames 301-307. It is noted for example that lines 1 and 3 of the in-field frame 301 and lines 2 and 4 of the in-field frame 303 are copied directly from the DV information. The second line of the in-field frame 301 is determined by averaging the first and third lines of the in-field frame 301. The first line of the in-field frame 303 is copied from the second line and the third line is determined by averaging the second and fourth lines of the in-field frame 303. The progressive frame generation circuit 207 receives corresponding parallel lines from each of the in-field frames 301-307 for determining the PV information of the progressive frame 209. In particular, the progressive frame generation circuit 207 uses the first line of each of the in-field frames 301-307 for determining the first line of the progressive frame 209, uses the second line of each of the in-field frames 301-307 for determining the second line of the progressive frame 209, and so on. Once the corresponding lines of the in-field frames 301-307 are retrieved, the storage locations within the buffers may be re-used for subsequent lines of the same frame. In this manner, in the illustrated embodiment each buffer or buffer space is sized to store only a few lines of each of the in-field frames 301-307 which significantly reduces memory requirements.

Figure 4:
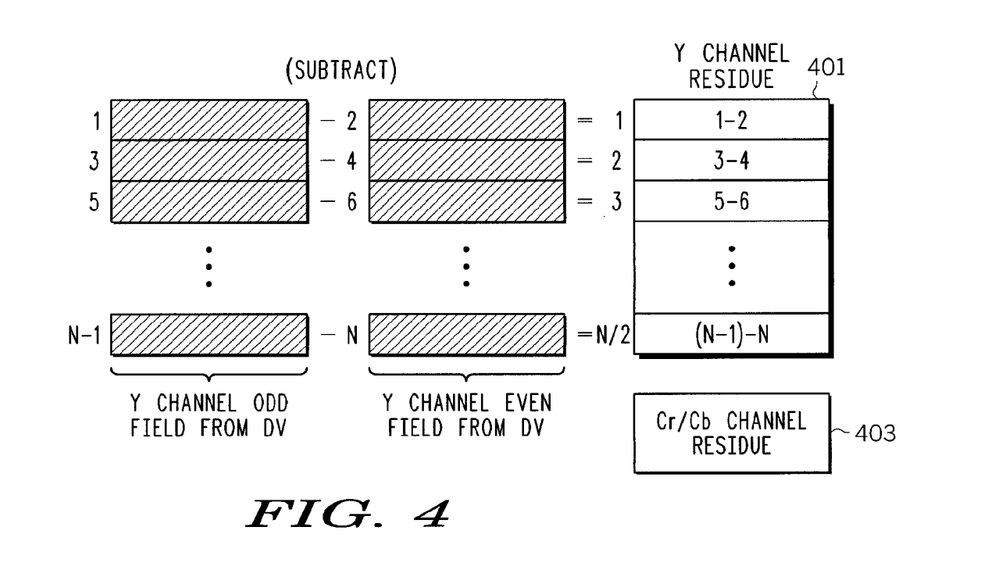
FIG. 4 is a figurative block diagram illustrating an exemplary residue generation procedure performed by the residue generation circuit of FIG. 2 according to one embodiment.
Figure 5:
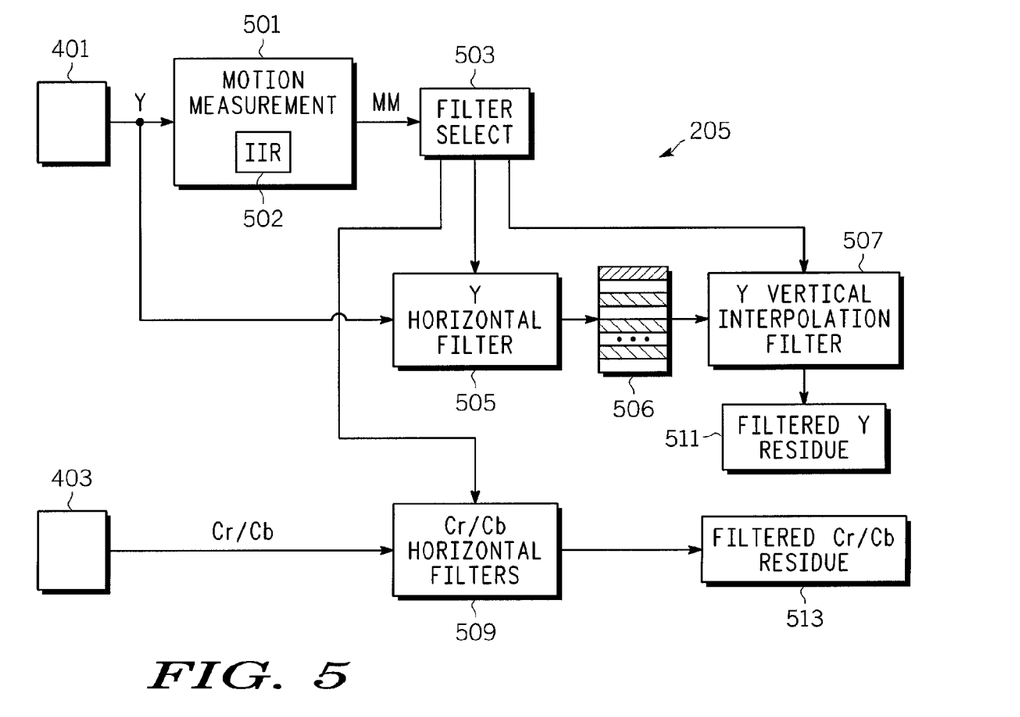
FIG. 5 is a block diagram of the residue processing circuit of FIG. 2 according to an exemplary embodiment.

FIG. 4 is a figurative block diagram illustrating an exemplary residue generation procedure performed by the residue generation circuit 203 according to one embodiment. Details are shown for the Y channel for generating a Y channel residue field 401, in which similar functions are performed (not shown) for generating a corresponding Cr/Cb channel residue field 403. For the Y channel, the residue generation circuit 203 determines a first residue or difference line 1 of the residue field 401 by subtracting the first even line 2 from the first odd line 1 of the DV information. The residue generation circuit 203 subtracts the second even line 4 from the second odd line 3 to determine a second line 2 of the Y channel residue field 401. The subtraction operation is repeated in similar manner up to the last lines of the odd and even fields in which line N is subtracted from line N-1 to determine the last line N/2 of the Y channel residue field 401. The input lines 1, 3, 5, . . . N-1 of the odd field and lines 2, 4, 6, . . . , N of the even field are shown shaded since sourced from the DV information provided by the buffer 102. Substantially the same subtraction operation is performed between the adjacent lines of the Cr/Cb channel to generate the Cr/Cb channel residue field 403. In one embodiment, the subtraction operation performed by the residue generation circuit 203 is a signed number operation so that the residue fields 401 and 403 store signed numbers. FIG. 5 is a block diagram of the residue processing circuit 205 according to an exemplary embodiment. The Y channel residue field 401 from the residue generation circuit 203 is provided to an input of a motion measurement circuit 501. The residue information within the residue fields 401 and 403 contains two dimensional (2D) motion information. The Y channel is the strongest component among the three color channels, so that the motion measurement is performed only on the Y channel residue field 401 to determine a motion metric (MM) for selecting filter and gain information as further described below. In one embodiment, the motion measurement circuit 501 determines the mean of the Y channel residue data block to generate the motion metric MM, which includes averaging and division calculations. The circuitry for performing the averaging and division calculations can be somewhat complex and difficult to implement in practical, low cost designs. In another embodiment, the motion measurement circuit 501 incorporates an infinite impulse response (IIR) filter 502 to generate the motion metric MM. An IIR filter performs faster, is significantly easier to implement and consumes less bus/memory bandwidth as compared to circuitry performing the averaging and division calculations. In one embodiment, the system function H(z) (in Z-transform) performed by the IIR filter 502 of the motion measurement circuit 501 is according to the following equation (1):

$$H(z) = \frac{\alpha}{1 - (1 - \alpha)z^{-1}} \quad (1)$$

where α is a filter control factor in which α<<1, and in which i and j are indexes of pixel values iterated in the row and column ranges of the defined block of information. A time-domain implementation of the IIR filter 502 according to equation (1) for processing the information of the Y channel residue field 401 is according to the following equation (2):

$$MM=(1-\alpha)\cdot MM+\alpha\cdot Y(i,j) \quad (2)$$

The motion metric MM indicates the intensity of motion of the video information being processed and is used to adjust filter coefficient and gain values for residue processing. Alternative methods of determining the MM value are contemplated, such as a finite impulse response (FIR), an analog filter, non-linear processes, a lookup table, etc.

The motion metric MM is provided to the input of a filter select circuit 503, having outputs for determining or otherwise selecting a Y horizontal filter 505, a Y vertical interpolation filter 507, and a pair of Cr/Cb horizontal filters 509. The Y channel residue field 401 is provided to an input of the Y horizontal filter 505, which processes or filters each horizontal line of the Y channel residue field 401 to provide a horizontally filtered field 506. In particular, each horizontal line of the Y channel residue field 401 is processed through the Y horizontal filter 505 to generate every other line of the horizontally filtered field 506, in which zero-valued lines are inserted in between. The horizontally filtered field 506 is then processed by the Y vertical interpolation filter 507 to provide a filtered Y residue frame 511. In particular, each vertical line of pixels of the horizontally filtered field 506 is processed through the Y vertical filter 507, in which the inserted zero-valued pixels are interpolated through filtering to complete that column of information. The process is repeated for each column of pixels from left to right to calculated the frame of information provided within the filtered Y residue frame 511. The Cr/Cb channel residue field 403 is provided to the input of the Cr/Cb horizontal filters 509, which processes or filters each horizontal line of the Cr/Cb channel residue field 403 to provide a filtered Cr/Cb residue frame 513. The Cr and Cb channels contain information to reconstruct color and thus have less intensity and less bandwidth. To save processing latency, only horizontal filtering is used, although different filters are used for alternating horizontal lines.

Figure 6:
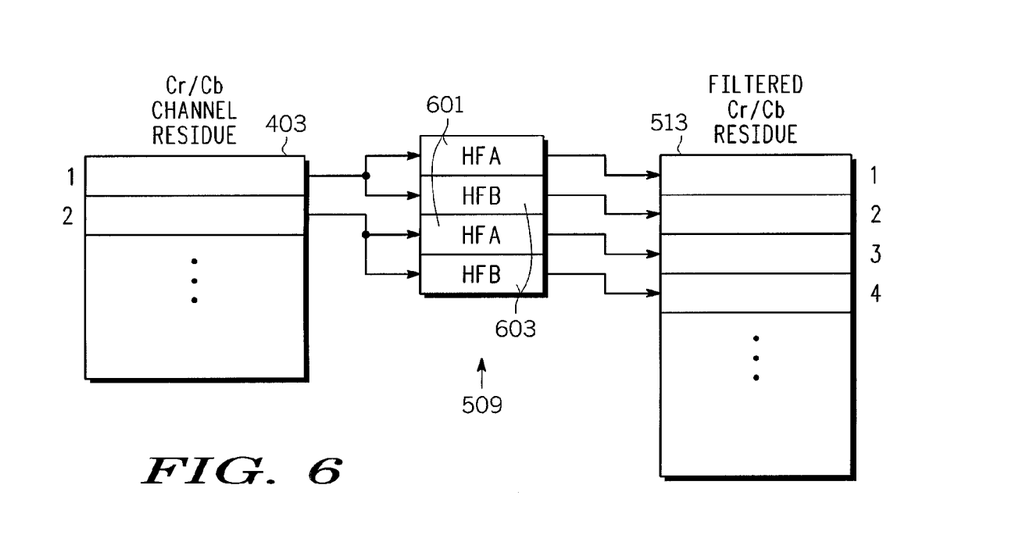
FIG. 6 is a block diagram illustrating the filtering process of the Cr/Cb horizontal filters of FIG. 5 for converting the Cr/Cb channel residue field of FIG. 4 into the Cr/Cb filtered residue frame of FIG. 5 according to one embodiment.

FIG. 6 is a block diagram illustrating the filtering process of the Cr/Cb horizontal filters 509 for converting the Cr/Cb channel residue field 403 into the filtered Cr/Cb residue frame 513 according to one embodiment. The filter select circuit 503 selects the coefficients for two filters HFA and HFB of the Cr/Cb horizontal filters 509. Each line of the Cr/Cb channel residue field 403 is processed by both filters HFA and HFB to generate two corresponding adjacent lines of the filtered Cr/Cb residue frame 513. In particular, the first line of the Cr/Cb channel residue field 403 is processed through the HFA filter to generate the first line and through the HFB filter to generate the second line of the filtered Cr/Cb residue frame 513. In a similar manner, the second line of the Cr/Cb channel residue field 403 is processed through the HFA filter to generate the third line and through the HFB filter to generate the fourth line of the filtered Cr/Cb residue frame 513. Operation proceeds in similar manner to filter each line of the Cr/Cb channel residue field 403. The HFB filter performs interpolation since it interpolates information for the blank lines based on information of the non-blank lines. In particular, the second line is interpolated based on the first line, the fourth line is interpolated from the third line, and so on.

It is noted that filtering may be performed using a single buffer space. In particular, the consecutive lines of the Cr/Cb channel residue field 403 are spread out in the buffer by inserting blank lines (so that the odd lines initially contain valid information and the even lines initially contain invalid information). The first line of the Cr/Cb channel residue field 403 is processed through the second filter HFB to generate the contents of the second line. The first line is processed again through the first filter HFA and the results are re-stored back into the first line. Likewise, the third line of the Cr/Cb channel residue field 403 is processed through the second filter HFB to generate the contents of the fourth line and the third line is processed again through the first filter HFA and the results are re-stored back into the third line. This process continues in similar manner until the frame is completed.

Figure 7:
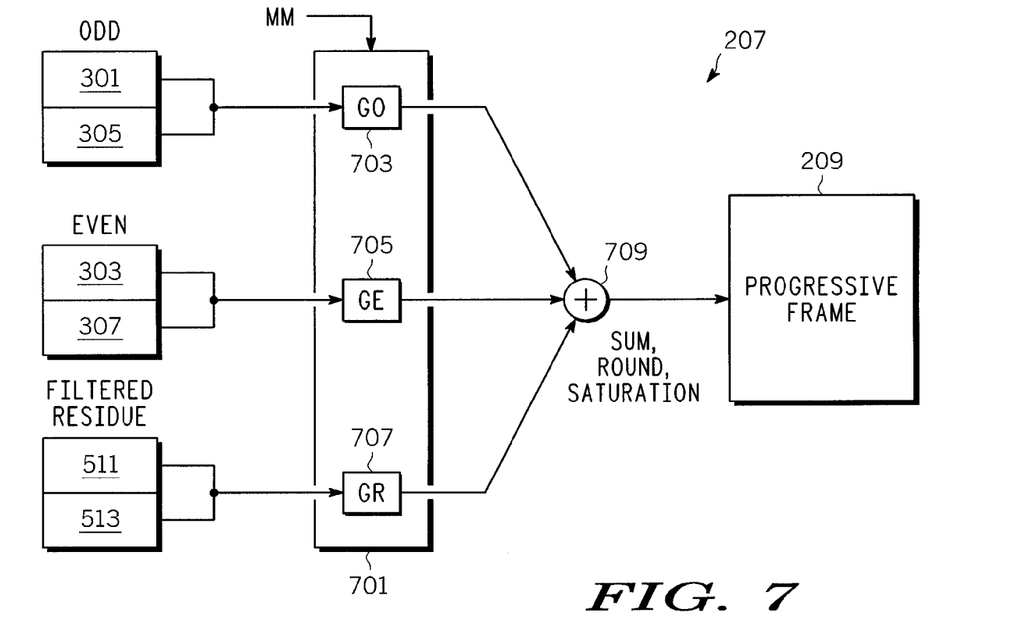
FIG. 7 is a block diagram of the progressive frame generation circuit of FIG. 2 according to one embodiment.

FIG. 7 is a block diagram of the progressive frame generation circuit 207 according to one embodiment. The progressive frame generation circuit 207 includes a programmable or selectable gain bank 701 in which the respective gains are selected or programmed based on the motion metric MM. The odd Y and Cr/Cb channel in-field frames 301 and 305 are provided to a first gain block 703 within the gain bank 701 in which the gain block 703 has a gain GO. The even Y and Cr/Cb channel in-field frames 303 and 307 are provided to a second gain block 705 within the gain bank 701 in which the gain block 705 has a gain GE. The filtered Y and Cr/Cb residue frames 511 and 513 are provided to a third gain block 707 within the gain bank 701 in which the gain block 707 has a gain GR. The outputs of the gain blocks 703, 705 and 707 are combined by a combiner 709 to generate the progressive frame 209. In one embodiment, the combiner 709 sums the outputs of the gain blocks 703, 705 and 707, rounds the summed result to the nearest integer, and performs a saturation function. The saturation function limits the pixel values to a predetermined maximum value allowed for the progressive frame 209, such as, for example, a maximum value of 255. The gain values GO and GE are selected to perform a relative weighting function between the odd and even in-field frames. Thus, the output of the first gain block 703 is a first weighted frame, the output of the second gain block 705 is a second weighted frame, and the output of the gain block 707 is a third weighted frame. In one embodiment, each of the gain values GO and GE are fixed at one-half (½) to effectively average the odd and even in-field frames (or otherwise to add substantially equal proportions of the first and second in-field frames with a weighted proportion of the filtered residue frame). In another embodiment, the gain values GO and GE may be slightly adjusted within a relatively small range around ½ based on MM, and the sum of GO and GE remains equal to approximately 1. The residue information includes signed values and the gain value GR controls how much residue information is added in as determined by the value of the motion metric MM. In general, the greater the value of MM, the larger the value of MM.

One or more of the filter coefficients of the Y horizontal filter 505, the Y vertical interpolation filter 507, and the Cr/Cb horizontal filters 509 (i.e., HFA, HFB), and the gain values GO, GE, and GR are adjusted based on the motion metric MM to optimize visual quality of the video information by minimizing as much as possible the effects of interlace conversion from interlaced to progressive frames. In one embodiment, if the absolute value of the motion metric MM is greater than a predetermined threshold, then each of the filters, including the Y horizontal filter 505, the Y vertical interpolation filter 507, and the Cr/Cb horizontal filters 509, are low-pass finite impulse response (FIR) filters with predetermined coefficients, the gain values GO and GE are each set to one-half (½), and GR is set to one (1). If the absolute value of the motion metric MM is not greater than the predetermined threshold, then the filter coefficients and gain values are modified accordingly based on the level of MM, and the Y vertical interpolation filter 507 and the HFB filters are selected as band-pass filters rather than low-pass filters. In one embodiment, each of the filter coefficients and gain values may be calculated or adjusted within predetermined ranges based on the determined value of the motion metric MM. In an alternative embodiment, each of the filter coefficients and gain values are predetermined and stored in memory, such as a look-up table (LUT) or the like, in which each set of coefficients and gain values are selected based on the motion metric MM.

Figure 8:
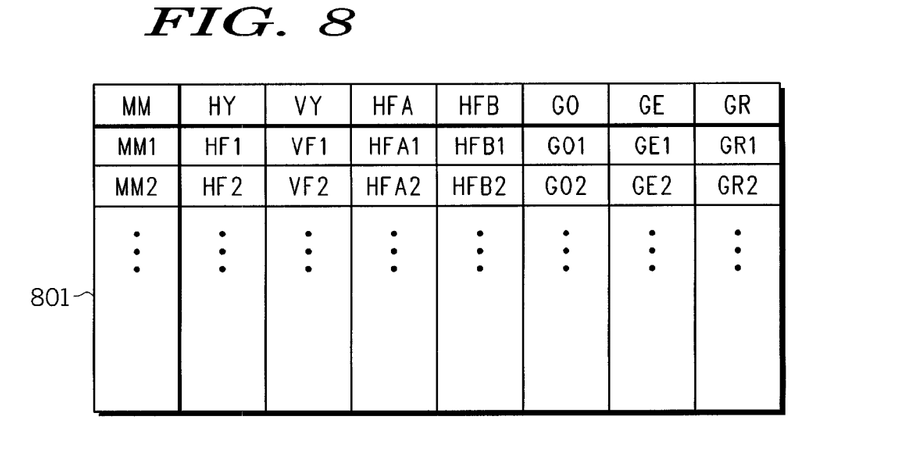
FIG. 8 is a tabular diagram illustrating an exemplary lookup table that may be employed by the de-interlacer of FIG. 1 for selecting filter coefficients for the filters of FIG. 5 and gain values for the gain blocks of FIG. 7.

FIG. 8 is a tabular diagram illustrating an exemplary LUT 801 that may be employed by the de-interlacer 103 for selecting filter coefficients and gain values for the Y horizontal filter 505, the Y vertical interpolation filter 507, the Cr/Cb horizontal filters 509 (i.e., HFA, HFB), and the gain values GO, GE, and GR. The LUT 801, for example, functions as the filter select circuit 503 and is used to program the appropriate gain values of the gain bank 701. Possible values of the motion metric MM are listed in the first column, shown as MM1, MM2, etc. The LUT 801 may include all possible values of MM. Alternatively, each entry MM1, MM2, etc., represents predetermined range of MM values to reduce the size of the LUT 801. The second column of the LUT 801 provides entries for the Y horizontal filter 505, abbreviated as "HY". The third column provides entries for the Y vertical interpolation filter 507, abbreviated as "VY". The fourth and fifth columns provide the entries for the Cr/Cb horizontal filters 509 including the HFA and HFB filters, respectively. The remaining three columns provide the entries for the gain values GO, GE, and GR, respectively. Each row of values are accessed using the corresponding value of MM as an index or address, and the accessed values are used for filtering and gain functions. It is noted that if any of the filters or gain value is fixed in a given configuration, then the values may be set in circuitry or code and removed from the LUT 801, or otherwise the table is populated with the fixed value. It is further noted that low-pass versus band-pass filtering may be selected simply as a function of the programmed coefficients. In this manner, the higher values of MM may use low-pass filtering whereas lower MM values correspond to band-pass filtering.

In the illustrated embodiment, the in-field frame generation circuit 201 generally performs an averaging function in which the odd lines are averaged to determine even lines of a first averaged frame and in which the even lines are averaged to determine odd lines of a second averaged frame. The combiner 709 of the progressive frame generation circuit 207 then effectively averages the first and second averaged frames together to provide an averaged frame. The residue generation circuit 203 takes the difference between the odd and even lines and filters the result based on a level of motion in the frame, such as a level of motion intensity or the like. The resulting filtered residue information provide offset values that are added to the averaged frame by the combiner 709 of the progressive frame generation circuit 207 to improve the visual results of the progressive frame 209. The offset values are scaled by the gain value GR, which is selected or adjusted based on the level of motion.

Figure 9:
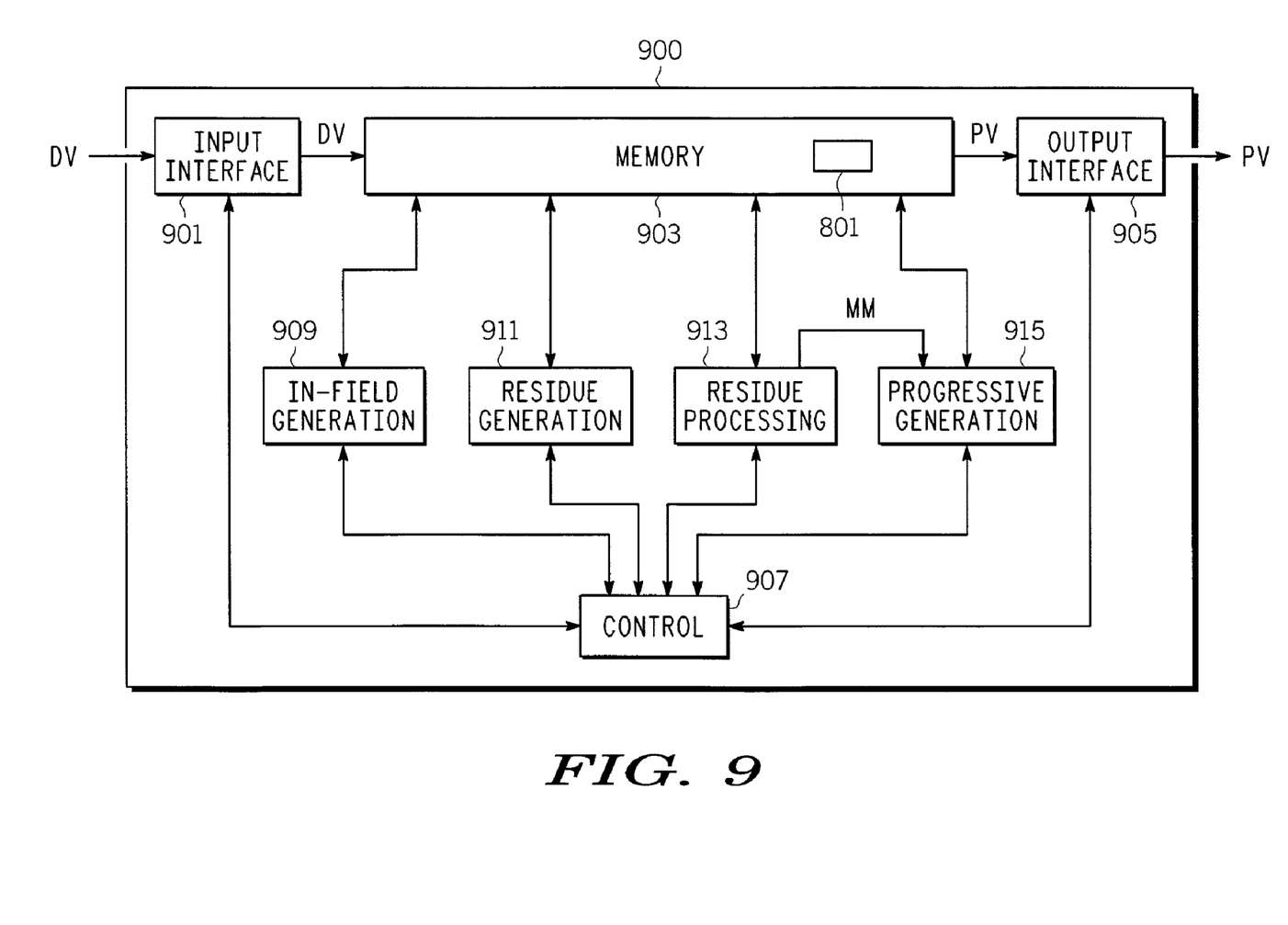
FIG. 9 is a block diagram of a de-interlacer device implemented according to one embodiment.

FIG. 9 is a block diagram of a de-interlacer device 900 implemented according to one embodiment. In one embodiment, the de-interlacer device 900 is integrated onto a single integrated circuit or chip which may be used within the video processing system 100 or the like. Alternatively, the de-interlace device 900 may be implemented using discrete logic or each of the functional blocks may be integrated onto separate semiconductor chips coupled together or the like. The de-interlace device 900 includes an input interface 901 receiving and providing the DV information to a memory 903, and an output interface 905 for providing PV information from the memory 903 to an external device. A control circuit 907 controls operations of the de-interlacer device 900 including timing and control of the input and output interfaces 901 and 905. The de-interlacer device 900 includes an in-field generation circuit 909 coupled to the memory 903 and performing the functions of the in-field frame generation circuit 201, a residue generation circuit 911 coupled to the memory 903 and performing the functions of the residue generation circuit 203, a residue processing circuit 913 coupled to the memory 903 and performing the functions of the residue processing circuit 205, and a progressive generation circuit 915 coupled to the memory 903 and performing the functions of the progressive frame generation circuit 207. The control circuit 907 is further coupled to control timing and operations of the circuits 909-915. The LUT 801 is shown stored within the memory 903. The residue processing circuit 913 determines and provides the motion metric MM to the progressive generation circuit 915.

The in-field generation circuit 909 receives DV information stored within the memory 903 and generates odd and even luma and chroma component in-field information (such as represented by the odd Y and Cr/Cb channel in-field frames 301 and 305 and the even Y and Cr/Cb channel in-field frames 303 and 307) stored within the memory 903. The residue generation circuit 911 receives DV information stored within the memory 903 and generates luma and chroma component residue information (such as represented by the Y and Cr/Cb channel residue fields 401 and 403) stored within the memory 903. The residue processing circuit 913 receives the luma and chroma component residue information stored in the memory 903 and generates filtered luma and chroma component residue information (such as represented by the filtered Y residue frame 511 and the filtered Cr/Cb residue frame 513) stored in the memory 903. The progressive generation circuit 915 receives the in-field and filtered residue information stored within the memory 903 and generates progressive information (such as represented by the progressive frame 209) stored in the memory 903. The memory 903 includes sufficient storage space for storing software, code or firmware or the like for execution by the control circuit 907 for controlling functions of the de-interlacer device 900, along with storage for constants or variables used during processing (e.g., the LUT 801), and sufficient buffer space for each of the circuits 909-915 for storing processed results. It is noted that the memory 903 need only include sufficient buffer space for processing only a few lines of the DV and PV information at a time in a similar manner as previously described.

A method of de-interlacing input video information according to one embodiment includes averaging odd lines of the input video information and averaging even lines of the input video information to determine first and second in-field information, determining differences between even and odd lines of the input video information to provide residue information, measuring a motion metric of the residue information, filtering the residue information based on the motion metric to provide filtered residue information, and combining the first and second in-field information with the filtered residue information to provide corresponding progressive information. The averaging may include, for example, averaging odd lines of the input video information to determine even lines of first in-field information and averaging even lines of the input video information to determine odd lines of second in-field information.

The method may include filtering luma components of the residue information with an infinite impulse response filter. The method may include determining a relative motion intensity of the residue information. The method may include selecting filter coefficients based on the motion metric. The method may include selecting from among multiple predetermined filter coefficients stored in a memory.

The method may include filtering horizontal lines of luma component values of the residue information to provide first filtered luma component residue values, and filtering and interpolating vertical lines of the first filtered luma component residue values and inserted zero values to provide filtered luma component residue information. The method may include filtering horizontal lines of chroma component values of the residue information to provide first filtered chroma component residue lines, and filtering the horizontal lines of chroma component values of the residue information to provide second filtered chroma component residue lines.

The method may include multiplying the first in-field information by a first gain value to provide first weighted information, multiplying the second in-field information by a second gain value to provide second weighted information, multiplying the filtered residue information by a third gain value to provide third weighted information, and adding the first, second and third weighted information together to provide the corresponding progressive information. The method may include determining at least one of the first, second and third gain values based on the motion metric. The method may include averaging the first and second in-field information and adding a scaled portion of the filtered residue information.

A video de-interlace system according to one embodiment includes an in-field generation circuit, a residue generation circuit, a residue processing circuit, and a combiner. The in-field generation circuit averages odd lines of interlaced information and averages even lines of the interlaced information to determine first and second in-field frames. The residue generation circuit determines a residue frame including differences between even and odd lines of the interlaced information. The residue processing circuit determines a motion metric of the residue frame and filters the residue frame based on the motion metric to provide a filtered residue frame. The combiner combines the first and second in-field frames with the filtered residue frame to provide a corresponding progressive video frame.

The residue processing circuit may include an infinite impulse response filter having in input receiving the residue frame and an output providing the motion metric. The video de-interlace system may include a memory storing predetermined filter coefficients selected by the motion metric and used by the residue processing circuit for filtering the residue frame. The video de-interlace system may include a first gain block which multiplies the first in-field frame by a first gain value, a second gain block which multiplies the second in-field frame by a second gain value, and a third gain block which multiplies the filtered residue frame by a third gain value. The third gain value may be selected based on the motion metric.

A de-interlacer device according to one embodiment includes a memory, input and output interfaces, an in-field generation circuit, a residue generation circuit, a residue processing circuit, and a combiner. The input interface receives and stores interlaced information into the memory. The output interface outputs progressive information from the memory. The in-field generation circuit averages odd lines of the interlaced information and averages even lines of the interlaced information to determine first and second in-field information stored in the memory. The residue generation circuit determines differences between the odd and even lines of the interlaced information to determined residue information stored in the memory. The residue processing circuit determines a motion metric of the residue information and filters the residue information using filter coefficients determined based on the motion metric to provide filtered residue information. The combiner combines the first and second in-field information with the filtered residue information to provide the progressive information.

The de-interlacer device may include a look-up table stored in the memory for storing predetermined filter coefficients selected by the residue processing circuit based on the motion metric for filtering the residue information. The de-interlacer device may include a gain block having an input receiving the filter residue information and an output providing scaled filtered residue information to the combiner Although the invention is described herein with reference to specific embodiments, various modifications and changes can be made without departing from the scope of the present invention as set forth in the claims below. For example, the DV information may be in the form of RGB values rather than luma and chroma components in which filter coefficients and gain values are adjusted accordingly. If the DV information is in the form of RGB values (rather than YCrCb), then only the luma component (Y channel) processing chain is used, including the Y horizontal filter 505 and the Y vertical interpolation filter 507. For RGB de-interlacing processing, the Cr/Cb chain is not used including the Cr/Cb horizontal filters 509. For RGB de-interlacing processing, the motion measurement circuit 501 is used to calculate the motion metric MM, which is calculated based on a weighted measurement of all three of the RGB color motion residues. The DV information may be in the form of a composite, single color signal or on any type of signal produced by a multi-spectral sensor. It should be understood that all circuitry or logic or functional blocks described herein may be implemented either in silicon or another semiconductor material or alternatively by software code representation of silicon or another semiconductor material. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of de-interlacing input video information, comprising:

averaging odd lines of the input video information and averaging even lines of the input video information to determine first and second in-field information;

determining differences between even and odd lines of the input video information to provide residue information;

measuring a motion metric of the residue information;

filtering the residue information based on the motion metric to provide filtered residue information; and combining the first and second in-field information with the filtered residue information to provide corresponding progressive information.

2. The method of claim 1, wherein said averaging comprises averaging odd lines of the input video information to determine even lines of the first in-field information and averaging even lines of the input video information to determine odd lines of the second in-filed information.

3. The method of claim 1, wherein said determining a motion metric of the residue information comprises filtering luma components of the residue information with an infinite impulse response filter.

4. The method of claim 1, wherein said determining a motion metric of the residue information comprises determining a relative motion intensity of the residue information.

5. The method of claim 1, prior to said filtering the residue information, further comprising selecting filter coefficients based on the motion metric.

6. The method of claim 5, wherein said selecting filter coefficients comprises selecting from among a plurality of predetermined filter coefficients stored in a memory.

7. The method of claim 1, wherein said filtering the residue information comprises:

filtering horizontal lines of luma component values of the residue information to provide first filtered luma component residue values; and filtering and interpolating vertical lines of the first filtered luma component residue values and inserted zero values to provide filtered luma component residue information.

8. The method of claim 1, wherein said filtering the residue information comprises:

filtering horizontal lines of chroma component values of the residue information to provide first filtered chroma component residue lines; and filtering the horizontal lines of chroma component values of the residue information to provide second filtered chroma component residue lines.

9. The method of claim 1, wherein said combining comprises:

multiplying the first in-field information by a first gain value to provide first weighted information;

multiplying the second in-field information by a second gain value to provide second weighted information;

multiplying the filtered residue information by a third gain value to provide third weighted information; and adding the first, second and third weighted information together to provide the corresponding progressive information.

10. The method of claim 9, further comprising determining at least one of the first, second and third gain values based on the motion metric.

11. The method of claim 1, wherein said combining comprises averaging the first and second in-field information and adding a scaled portion of the filtered residue information.

12. A video de-interlace system, comprising:

an in-field generation circuit which averages odd lines of interlaced information and which averages even lines of said interlaced information to determine first and second in-field frames;

a residue generation circuit which determines a residue frame comprising differences between even and odd lines of said interlaced information;

a residue processing circuit which determines a motion metric of said residue frame and which filters said residue frame based on said motion metric to provide a filtered residue frame; and a combiner which combines said first and second in-field frames with said filtered residue frame to provide a corresponding progressive video frame.

13. The video de-interlace system of claim 12, wherein said residue processing circuit comprises an infinite impulse response filter having in input receiving said residue frame and an output providing said motion metric.

14. The video de-interlace system of claim 12, further comprising a memory storing predetermined filter coefficients selected by said motion metric and used by said residue processing circuit for filtering said residue frame.

15. The video de-interlace system of claim 12, further comprising a first gain block which multiplies said first in-field frame by a first gain value, a second gain block which multiplies said second in-field frame by a second gain value, and a third gain block which multiplies said filtered residue frame by a third gain value.

16. The video de-interlace system of claim 15, wherein said third gain value is selected based on said motion metric.

17. A de-interlacer device, comprising:

a memory;

an input interface, coupled to said memory, which receives and stores interlaced information into said memory;

an output interface, coupled to said memory, which outputs progressive information stored in said memory;

an in-field generation circuit, coupled to said memory, which averages odd lines of said interlaced information and which averages even lines of said interlaced information to determine first and second in-field information stored in said memory;

a residue generation circuit, coupled to said memory, which determines differences between said odd and even lines of said interlaced information to determined residue information stored in said memory;

a residue processing circuit, coupled to said memory, which determines a motion metric of said residue information and which filters said residue information using filter coefficients determined based on said motion metric to provide filtered residue information; and a combiner, coupled to said memory, which combines said first and second in-field information with said filtered residue information to provide said progressive information.

18. The de-interlacer device of claim 17, further comprising a control circuit coupled to said input and output interfaces, said in-field circuit, said residue generation circuit, said residue processing circuit, and said combiner.

19. The de-interlacer device of claim 17, further comprising a look-up table, stored in said memory, which stores predetermined filter coefficients selected by said residue processing circuit based on said motion metric for filtering said residue information.

20. The de-interlacer device of claim 17, further comprising a gain block having an input receiving said filter residue information and an output providing scaled filtered residue information to said combiner.

* * * * *